May 7, 1935.   J. C. OLSEN   2,000,349
SEAL
Filed Oct. 29, 1932
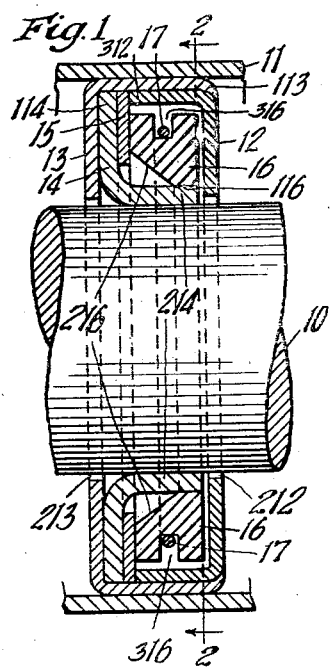
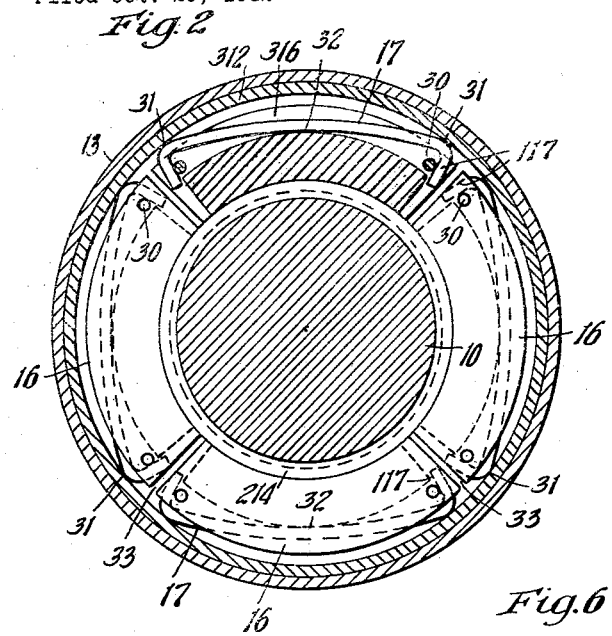
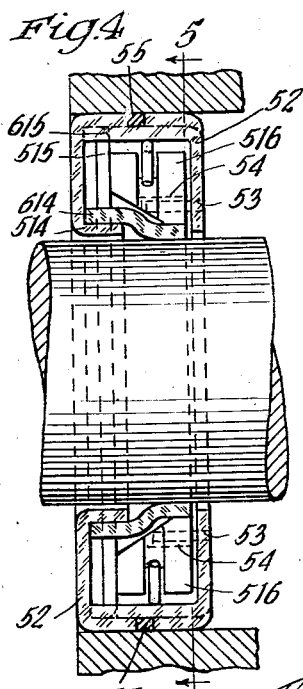
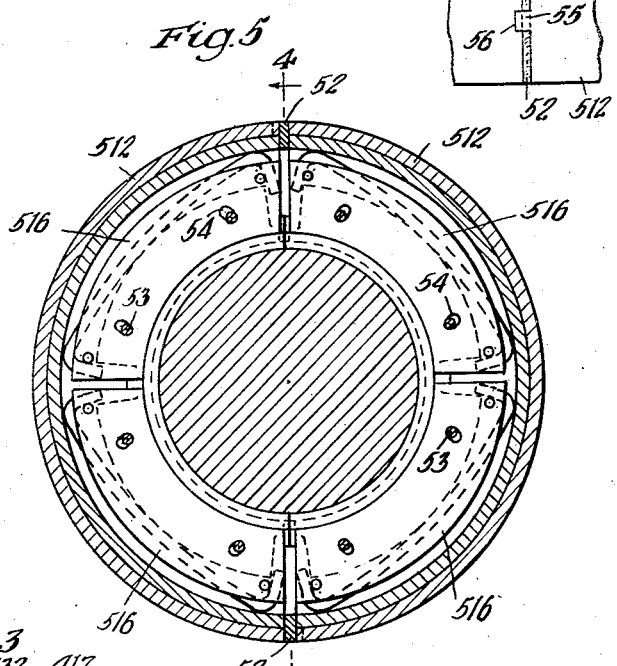
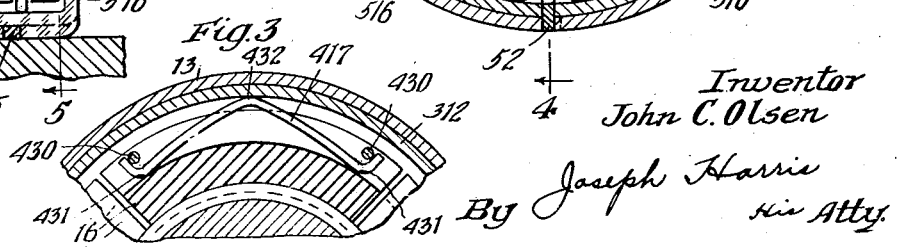
Inventor
John C. Olsen
By Joseph Harris
His Atty.

Patented May 7, 1935

2,000,349

UNITED STATES PATENT OFFICE 2,000,349

SEAL

John C. Olsen, Chicago, Ill., assignor to Flexible Steel Lacing Company, Chicago, Ill., a corporation of Illinois Application October 29, 1932, Serial No. 640,185

9 Claims. (Cl. 288—1)

This invention relates to improvements in seals and more particularly seals for shafts, commonly called oil seals.

In oil seals for shafting, it is generally recognized that, where a flexible packing is employed, the same should have a uniform pressure engagement with the shaft and that this pressure should be relatively light so as to obtain a "feather" touch and more particularly at the free edge only of the sleeve section of the washer which engages the shaft. Particularly is the uniform but featherlike pressure important when employed with shafts rotating at relatively high speed in order to prevent scoring of the shaft and also to minimize friction and generation of heat.

To attain the foregoing indicated desired results, particularly in connection with the use of leather washers, many expedients have been suggested for obtaining the light pressure such, for instance, as contractile coil springs encircling the washers; variously shaped spring metallic disks with slit fingers or prongs; and still others. However, none of these prior seals is entirely satisfactory, particularly if used with high speed shafts. The prior types of contractile means employed, as shown by tests, fail generally to produce a truly continuous or uninterrupted uniform contractile pressure on the washer, which lack of uniformity is accentuated as the shaft speeds become higher and any eccentricity of the shafts is encountered. Furthermore, heat generated under relatively high speeds, seriously affects many of the prior contractile means and oil, grease or other lubricants rapidly deteriorates rubber or rubber compounds that might otherwise be employed. Also, it is the common practice to draw or shape the washer, generally leather, to a definite size corresponding to the shaft with which it is intended for use and, in its initial condition, the washer material such as leather possesses a certain amount of stiffness or rigidity to resist collapse if the pressure is not too great but, if preheated, as quite common, before initial application or after use and removal, the washer material becomes quite limp or pliable whereupon the washer becomes unduly collapsed and distorted under the contractile springs, spring disks and the like, thus militating against efficient subsequent use.

One object of this invention is to provide a seal for preventing the passage or leakage of oil or other lubricant, water or other foreign matter, along a shaft and wherein is employed a flexible packing such that the contractile pressure on the packing to effect the joint seal, is uniformly continuously complete around the shaft; is relatively light or delicate to minimize friction and the possibility of scoring and of such character that the efficiency of the contractile pressure means is unaffected by heat or tolerated eccentricities of the shaft so that the same may be used with equal efficiency on either slow speed or relatively high speed shafts.

Another object of the invention is to provide a seal of the character indicated in the preceding paragraph wherein provision is made to prevent excessive contraction or collapse of the flexible packing regardless of its degree of pliability.

Another object of the invention is to provide a seal of the character above indicated which may be economically manufactured and assembled, and sold, shipped and applied completely assembled as a unitary article.

Another object of the invention is to provide a seal of the character indicated in the first two objects of the invention wherein the seal is made in sections, each constituting an assembly, such that the seal may be applied on a shaft having a shoulder thereon that would otherwise prevent a unitary or one piece assembly seal being slipped endwise of the shaft into place.

Another object of the invention is to provide a seal for a shaft wherein is incorporated a flexible washer arranged in such manner that no wear therefrom is imposed on the shaft.

Still another object of the invention is to provide a shaft seal for the purposes indicated, which seal may be put in place within the housing or chamber therefor notwithstanding that the shaft, outwardly of the housing or chamber, has a shoulder or collar thereon, the seal for this purpose being in sections suitable for assembly inwardly of the collar or shoulder on the shaft.

Other objects of the invention will more clearly appear from the description and claims hereinafter following.

In the drawing forming a part of this specification, Figure 1 is a vertical, diametrical, sectional view showing one embodiment of the improved seal in operative position on a shaft and within the usual housing. Figure 2 is a transverse, vertical, sectional view corresponding to the section line 2—2 of Figure 1, one of the pressure elements being shown in section to more clearly illustrate the details of construction.

Figure 3 is a detailed sectional view similar to

Figure 2, illustrating a modified form of spring arrangement for the pressure blocks. Figures 4 and 5 are views similar to Figures 1 and 2, illustrating the seal formed in sections and adapted for application to shafts having shoulders or collars thereon which would otherwise prevent slipping the seals endwise of the shaft into place, Figure 4 being on the section line 4—4 of Figure 5 and Figure 5 being on the section line 5—5 of Figure 4. Figure 6 is a detailed top plan view of the joint between the sections of the seal illustrated in Figures 4 and 5.

In said drawing, and referring first to the construction shown in Figures 1 and 2, 10 indicates a portion of a shaft with which the seal is adapted to be employed, the shaft being suitably journaled and extending through a housing on the machine, portions of which are indicated at 11, and the interior of which is preferably circular and concentric with the shaft.

The improved seal proper comprises, broadly, a preferably sheet metal casing consisting of two telescoped elements 12 and 13; a flexible washer 14; a clamping ring 15; a plurality of pressure blocks or elements 16—16; and a corresponding number of springs 17—17.

The casing is preferably comprised of two substantially cup-shaped sheet metal members 12 and 13, the former being telescoped within the latter with a friction fit as shown and, after the parts have been properly assembled, the two casing members 12 and 13 are permanently secured together in any suitable manner as by spinning the free edge 113 of the outer member over the corner of the inner telescoped member 12. The side walls of the members 12 and 13 are suitably apertured as indicated at 213 and 212 to accommodate the shaft 10 therethrough, the apertures being of slightly greater diameter than the diameter of the shaft so as to allow for any slight eccentric motion of the shaft without danger of scoring the latter.

The washer 14, preferably of leather, is formed with an outer radial flange section 114 and a sleeve section 214 extending lengthwise of the shaft and engaging the latter as shown. The flange section 114 of the washer is preferably tightly and immovably clamped in position by the annular metal ring 15, which in turn is pressed against the washer by the peripheral flange 312 of the member 12 when the latter is telescoped within the outer member 13, thus preventing bodily shift of the washer while permitting such slight movements, radially, of the sleeve section 214 as may be desirable The pressure blocks or elements 16 may be of any suitable number, four being chosen for illustration. Each of said elements 16 is of arcuate form having an inner pressure edge 116 formed on an arc concentric with the shaft and of such radius as to correspond to the thickness of the washer. The pressure edge 116 is so located as to engage the sleeve section 214 of the washer only adjacent the free edge portion of the washer and said pressure edge is of such width, considered lengthwise of the shaft, as to provide an area or band of contact with the washer of appreciable width. Each element 16 is diagonally and outwardly cut back or beveled in cross section as indicated at 216 so as to clear the bend and adjacent portions of the sleeve section of the washer, as clearly shown in Figure 1, and at the same time provide an effective thickness for the element 16, lengthwise of the shaft, so as to maintain it in proper position within the casing while leaving a slight clearance to allow for free radial movement without undue friction. On its outer side, each pressure element 16 is preferably provided with an arcuate groove or seat 316 also concentric with the shaft and within which groove is received the corresponding spring 17.

Each spring 17 is preferably in the form of a relatively light wire possessing inherent resiliency and having its main portion initially bent on an arc or curve of relatively long radius, the ends of the spring wire being bent approximately radially inwardly as indicated at 117—117, so as to hook over the retaining pins 30—30 extending transversely of the pressure element 16 within the groove 316. In this connection, it will be observed also that each element 16 is cut or recessed at its radially extending ends so as to receive the bent ends 117 of the spring and house the latter and prevent the same from projecting beyond the ends of the pressure elements. With the springs 17 formed as shown and described, it will be observed that each has point engagement at its ends as indicated at 31—31 with the inner surface of the peripheral wall of the casing and also has a single point bearing at its center and at the center of the element 16 as indicated at 32. The springs 17 are put in under a relatively slight initial flexure so as to afford the desirable, inward pressure on the pressure elements 16. It will also be seen that each element 16 is fulcrumed or adapted for slight tilting movement about the fulcrum point 32, thus insuring uniform and completely equalized pressure from the element 16 throughout the entire area line of contact with the washer, the permissible bodily movement as well as the permissible tilting movement referred to of the elements 16 insuring maintenance of this uniformity of pressure under all conditions, including any slight eccentric movement of the shaft. By forming the spring elements 17 as shown, the spring tension may be very delicately adjusted and made as light as desired since, because of the relatively broad span between the contact points 31, changes in effective spring pressure are comparatively minute even though the central point 32 of the spring moves inwardly and outwardly an appreciable distance. In this connection, it may be observed that the drawing is on approximately twice the scale of actual size in order to better illustrate details of construction, and that the gage employed in the wire spring 17 is, actually, comparatively small so as to obtain the desirable featherlike pressure for the washer.

It will be noted also that the ends of the pressure elements 16 are cut substantially on a radius with a slight normal clearance between the ends of each adjacent pair of elements, this clearance 33 being considerably exaggerated in the drawing and in actual practice being confined to about 1/64th to 1/32nd inch. Said clearances are reduced to a minimum to allow first, for the necessary individual adjustments of the elements 16 and second, to prevent any possibility of collapse of the washer when the seal is not in place, it being evident that, since the elements 16 are arranged circularly and constitute substantially a complete annular ring, any slight contraction of the washer will result in the ends of the elements 16 coming into engagement and thus limiting the possible inward contraction of the washer. The elements 16 are preferably made of material which will be unaffected by either heat, oil or other lubricant, water or the like, and of sufficient rigidity to prevent flexing or distortion under any of the slight pressures to which they are subject, while at the same time, preferably being of such compressibility that, should there be any slight inequality in the thickness of the portions of the washer engaging the inner surface thereof, the elements 16 will conform thereto.

With the construction shown and described, it is evident that the free edge portion of the sleeve section of the washer is pressed with a feather-like pressure throughout its circumference; such pressure may be delicately balanced for varying conditions; each pressure element is individually spring influenced and so mounted as to readily accommodate itself to all variations occurring in service; the circular series of pressure elements provides a complete or substantially continuous band of appreciable width, lengthwise of the shaft, of contact with the tubular or sleeve section of the washer; the parts may be manufactured at small expense and readily sold, shipped and applied as a unitary assembly; and there are no parts to be injuriously affected by either heat or lubricant.

Referring to the form of the invention shown in Figure 3, all of the parts are substantially the same as in the structure previously described, except that the springs 417 for the pressure blocks are so arranged as to provide a single fulcruming point contact 432 with the casing and two points of contact 431—431 with the pressure block. The turned ends of the spring are retained by suitable pins 430 carried by the pressure blocks in the outer grooves thereof. It will be evident that the action remains the same as in the first described construction.

Referring to the construction shown in Figures 4, 5 and 6, the seal is generally of the same construction as that shown in Figures 1 and 2. The casing, however, is formed in two half sections 512—512, each of which carries two pressure blocks 516—516, the latter being spring controlled in the same manner as shown and described in connection with the first form. Each section 512 of the outer casing member, is provided with an inturned, inner sleeve section 514 of semi-circular contour and slightly greater diameter than the shaft so as to provide a slight clearance therebetween. The leather washer, likewise diametrically split into half sections, has the outer portion 614 of each of its sections of semi-circular contour encircling and supported on the corresponding inner sleeve sections 514 and is clamped thereto by the clamp plate 515, the inner edge of which tightly engages the leather washer, it being understood that the clamp plate 515 is likewise in two sections. In this construction, due to elimination of the flange section of the leather washer, the clamping plate sections 515 are each preferably of cup shape with an out-turned outer flange 615 to maintain the clamp plate sections spaced from the corresponding wall of the outer casing member. To retain the pressure blocks in assembled relation with their corresponding half casing sections, pins 53 are secured to the inner wall of the casing and extended to the interior thereof within slightly radially elongated slots 54 of the pressure blocks, thus allowing the pressure blocks the desired radial movement but preventing circumferential shift.

To seal the joints between the casing sections, a thin facing of leather or the like 52 is inserted therebetween, the same being preferably cemented to one of the casing sections and corresponding in outline to the cross section of the assembled casing parts. When the parts are assembled over the shaft and brought together within the bearing housing, the leather facing 52 will provide the necessary seal between the casing sections and the adjacent edges of the leather washer 512—614 will be sufficiently compressed to close up the joint between their opposed faces.

With the split construction, it is evident that the seal may be applied on shafts which may have a shoulder or collar thereon outwardly of the housing within which the seal is to be inserted, it being understood that the two half sections of the seal will be brought together around the shaft intermediate such collar or shoulder and the housing and then slipped longitudinally into place. To prevent possibility of the two half sections shifting relatively to each other lengthwise of the shaft after being assembled and placed within the housing, the halves of the outer casing member will preferably be provided with closely fitting tongue and notch arrangments, as indicated at 55 and 56 in Figure 6, the leather facing 52 being suitably notched as best indicated in Figure 4 to accommodate the tongues 55. When the seal of the construction shown in Figures 4, 5 and 6 just described, is assembled and in place over the shaft within the housing, it will be obvious that the two sleeve sections 514 together constitute a circular flange extending axially inwardly of the annular casing, which flange is of a slightly greater inside diameter than the diameter of the shaft to be accommodated and that this circular flange 514—514 has telescoped thereover and sealed therewith the slightly radially outwardly offset circular section 614—614 of the flexible packing or washer.

Throughout the preceding description, the seals have been described in connection with rotating shafts only but it is obvious that the seals may be used with reciprocating rods or pistons where a sealing effect is desired and where the term shaft is hereinafter used in the claims, it is to be understood that the same is used generically to include both rotating shafts and reciprocating rods or shafts unless the context clearly indicates otherwise. Furthermore, the seals have been described with particular reference to preventing the passage of oil or lubricant therethrough. It is obvious that the seal is effective for preventing the passage therethrough of any liquid or semi-liquid or foreign matter generally such as water and dust.

Although the preferred manner of carrying out the invention has herein been shown and described, the same is merely illustrative and all changes and modifications are contemplated that come within the scope of the claims appended hereto.

What is claimed is:

1. A seal of the character described, comprising: a casing having axially apertured side walls to accommodate a shaft therethrough; a flexible packing within the casing having an axial sleeve section; and means for yieldingly constricting said sleeve section including; a plurality of separate, pressure elements circumferentially arranged around the sleeve section and independent spring devices associated with each of said elements normally urging the same radially inward, said pressure elements together constituting an approximately continuous ring around the sleeve section, said ring and sleeve section having a substantially continuous band of contact of appreciable area.

2. A seal in accordance with claim 1 wherein the casing and packing are made in sections adapted to be assembled around the shaft and the adjacent ends of the casing sections have interlocking formations preventing relative axial shift when in operative position.

3. A seal of the character described, comprising: a casing having axially apertured side walls to accommodate a shaft therethrough; a flexible packing within the casing having an axial sleeve section; and means for yieldingly constricting said sleeve section including; a plurality of separate, pressure elements each having an inner curved bearing face corresponding to the curvature of the sleeve section, said elements being circumferentially arranged and constituting an approximately complete but articulated ring around and directly engaging the flexible sleeve; and a spring device associated with each of said elements, said spring devices and respective associated elements functioning independently of each other.

4. A seal in accordance with claim 3 wherein the casing and packing are in sections and part of said constricting means are carried by each section of the casing; and means for preventing relative axial shift between the casing sections when the casing and parts within are assembled in operative position.

5. An assembled unitary seal of the character described, comprising: a casing having axially apertured side walls to accommodate a shaft therethrough; a flexible packing within the casing having an axial sleeve section; and means for yieldingly constricting said sleeve section including; elements relatively non-compressible and conformed to the packing sleeve and each independently spring-influenced radially inward, said elements being of arcuate form normally slightly spaced at their ends, and of appreciable width on their contacting faces, the spacing being of predetermined amount to thereby limit the constricting movement of said elements and of the flexible packing by the ends of said elements coming into engagement.

6. In a seal of the character described, the combination with a casing; of a flexible washer disposed within the casing and having a sleeve section; a plurality of disconnected, independent and separately acting pressure elements engaging and disposed around said sleeve section, said elements having contacting pressure surfaces of appreciable width in engagement with the free edge area only of the sleeve section; and means normally yieldingly urging said elements radially inward.

7. A seal in accordance with claim 9 wherein the casing and washer are formed in sections and a part of the pressure-acting elements and yielding means associated therewith are carried by each casing section, and the adjacent ends of the casing sections are provided with interlocking formations arranged to prevent relative axial shift between the casing sections.

8. A seal of the character described for sealing opposed and parallelly extending surfaces of two relatively movable inner and outer members, said seal comprising: a casing having a wall thereof adapted to form a fluid tight fit with one of said parallelly extending surfaces; a packing carried by said casing and having a section thereof in sealing engagement with the casing and a tubular section adapted to engage the other of said parallelly extending surfaces; and means yieldingly influenced to uniformly press said tubular packing section into sealing engagement with said other of said parallelly extending surfaces, said means including a plurality of disconnected and independently adjustable pressure elements arranged in a circular series and together providing a substantially continuous band of appreciable width, parallel to said surfaces, of direct contact with said tubular packing section.

9. A seal for a shaft rotatable within a relatively fixed housing, said seal comprising: an annular sheet metal casing centrally apertured to accommodate the shaft therethrough, the periphery of the casing being adapted to form a sealed fit with the interior of the housing when in place; a flexible packing having a radial flange and an axial shaft-engaging sleeve section; means to maintain said flange section in sealed engagement with a wall of the casing; a circularly arranged series of completely independent and separately, radially movable pressure elements within the casing encircling and each having arcuate surface engagement with the washer sleeve section and together providing a substantially continuous band of direct contact with the sleeve section in the vicinity and inwardly of its free edge; and spring means within the casing associated with the pressure elements normally urging the latter radially inward.

JOHN C. OLSEN.